US011766931B2

United States Patent
Pezzati et al.

(10) Patent No.: US 11,766,931 B2
(45) Date of Patent: Sep. 26, 2023

(54) CAR PROVIDED WITH A REAR SUBFRAME

(71) Applicant: FERRARI S.p.A., Modena (IT)

(72) Inventors: Andrea Pezzati, Modena (IT); Andrea Merulla, Modena (IT)

(73) Assignee: FERRARI S.P.A., Modena (IT)

( * ) Notice: Subject to any disclaimer, the term of this patent is extended or adjusted under 35 U.S.C. 154(b) by 248 days.

(21) Appl. No.: 17/391,238

(22) Filed: Aug. 2, 2021

(65) Prior Publication Data

US 2022/0041055 A1 Feb. 10, 2022

(30) Foreign Application Priority Data

Aug. 4, 2020 (IT) .................. 102020000019198

(51) Int. Cl.
| | |
|---|---|
| *B60K 17/24* | (2006.01) |
| *B60G 3/18* | (2006.01) |
| *B60G 7/00* | (2006.01) |
| *B60K 1/02* | (2006.01) |
| *B60K 5/00* | (2006.01) |
| *B60K 7/00* | (2006.01) |

(Continued)

(52) U.S. Cl.
CPC ............... *B60K 17/24* (2013.01); *B60G 3/18* (2013.01); *B60G 7/001* (2013.01); *B60K 1/02* (2013.01); *B60K 5/00* (2013.01); *B60K 7/0007* (2013.01); *B60K 17/32* (2013.01); *B62D 25/08* (2013.01); *B62D 27/065* (2013.01); *B60G 2200/46* (2013.01); *B60K 2007/0092* (2013.01)

(58) Field of Classification Search
CPC .......... B60K 17/24; B60K 17/32; B60K 1/02; B60K 5/00; B60K 7/0007; B60K 2007/0092; B60G 3/18; B60G 7/001; B60G 2200/46; B62D 25/08; B62D 27/065
See application file for complete search history.

(56) References Cited

U.S. PATENT DOCUMENTS

| | | | | |
|---|---|---|---|---|
| 4,429,900 A | * | 2/1984 | Feher .................. | B60G 7/02 280/124.128 |
| 9,701,250 B1 | * | 7/2017 | Ranga ................. | B62D 29/004 |

(Continued)

FOREIGN PATENT DOCUMENTS

| | | |
|---|---|---|
| JP | 2009274618 A | 11/2009 |
| WO | 2013059679 A1 | 4/2013 |

OTHER PUBLICATIONS

Search Report for Italian Application No. 102020000019198 completed Apr. 13, 2021, 10 pages.

*Primary Examiner* — Erez Gurari
(74) *Attorney, Agent, or Firm* — CANTOR COLBURN LLP (57) ABSTRACT

A car having: a frame; two rear drive wheels; two rear suspensions, which support the two rear wheels; a drivetrain having two axle shafts, which transmit the motion to the rear drive wheels; a rear subframe, which is fixed to the frame in four fixing points through the interposition of elastic isolating elements, directly supports at least part of the drivetrain, and provides a coupling for the rear suspensions. The four fixing points are substantially arranged at the same vertical height. The frame has two "C"-shaped elements, each having its two ends in the area of two fixing points. Two stiffening beams are provided, each arranged longitudinally and screwed to the frame in the area of the ends of a corresponding "C"-shaped element.

15 Claims, 7 Drawing Sheets

(51) Int. Cl.
  *B60K 17/32*   (2006.01)
  *B62D 25/08*   (2006.01)
  *B62D 27/06*   (2006.01)

(56) References Cited

U.S. PATENT DOCUMENTS

| | | | |
|---|---|---|---|
| 10,953,715 B1* | 3/2021 | Long | B60G 7/006 |
| 11,084,351 B2* | 8/2021 | Takahashi | B60G 7/001 |
| 2016/0347159 A1* | 12/2016 | Perlo | B60K 17/348 |
| 2019/0176555 A1* | 6/2019 | Behn | B60G 7/02 |
| 2019/0283518 A1* | 9/2019 | Battaglia | B60G 11/08 |
| 2019/0283561 A1* | 9/2019 | Battaglia | B62D 7/18 |
| 2020/0062060 A1 | 2/2020 | Chevalier et al. | |
| 2020/0361536 A1* | 11/2020 | Swain | B60G 11/02 |
| 2021/0009190 A1* | 1/2021 | Wang | B62D 7/1581 |
| 2022/0041055 A1* | 2/2022 | Pezzati | B62D 27/065 |
| 2022/0212527 A1* | 7/2022 | Kraft | B62D 21/11 |
| 2023/0013969 A1* | 1/2023 | Holland | B60K 17/043 |

* cited by examiner

CAR PROVIDED WITH A REAR SUBFRAME

CROSS-REFERENCE TO RELATED APPLICATIONS

This patent application claims priority from Italian patent application no. 102020000019198 filed on Aug. 4, 2020, the entire disclosure of which is incorporated herein by reference.

TECHNICAL FIELD

The invention relates to a car provided with a rear subframe.

PRIOR ART

The frame of a car is the bearing structure thereof to which all the different components of the car are directly or indirectly fixed; as a consequence, the suspensions supporting the wheels and the propulsor (which can be a heat engine or an electric motor) are fixed to the frame.

In order to increase the comfort of the occupants of the passenger compartment, there has to be a reduction in the transmission of the vibrations generated by the rolling of the wheels on the road surface to the frame; for this reason, the rear suspensions are fitted to a rear subframe, which is fixed to the frame through the interposition of elastic isolating means (for example small rubber blocks), which isolate the frame from the rear subframe from a vibrational point of view. Namely, the vibrations generated by the rolling of the wheels on the road surface are transmitted to the rear sub-frame (to which the rear suspensions are directly constrained), but are not transmitted (if not for a very small part) from the rear subframe to the frame thanks to the interposition of the elastic isolating elements.

The use of a rear subframe connected to the frame by means of elastic isolating elements is very effective in reducing the level of vibrations transmitted to the frame (and, hence, perceived by the occupants of the passenger compartment); however, on the other hand, this solution can seriously jeopardize the dynamic performances of the car, in particular its ease of handling, and can significantly reduce structural efficiency (measured, for example, as specific torsional stiffness, i.e. per mass unit).

Patent application JP2009274618A1 discloses a car provided with a rear subframe, which supports an engine arranged in a rear position.

DESCRIPTION OF THE INVENTION

The object of the invention is to provide a car having, at the same time, top comfort and high dynamic performances.

According to the invention, there is provided a car provided with a rear subframe according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
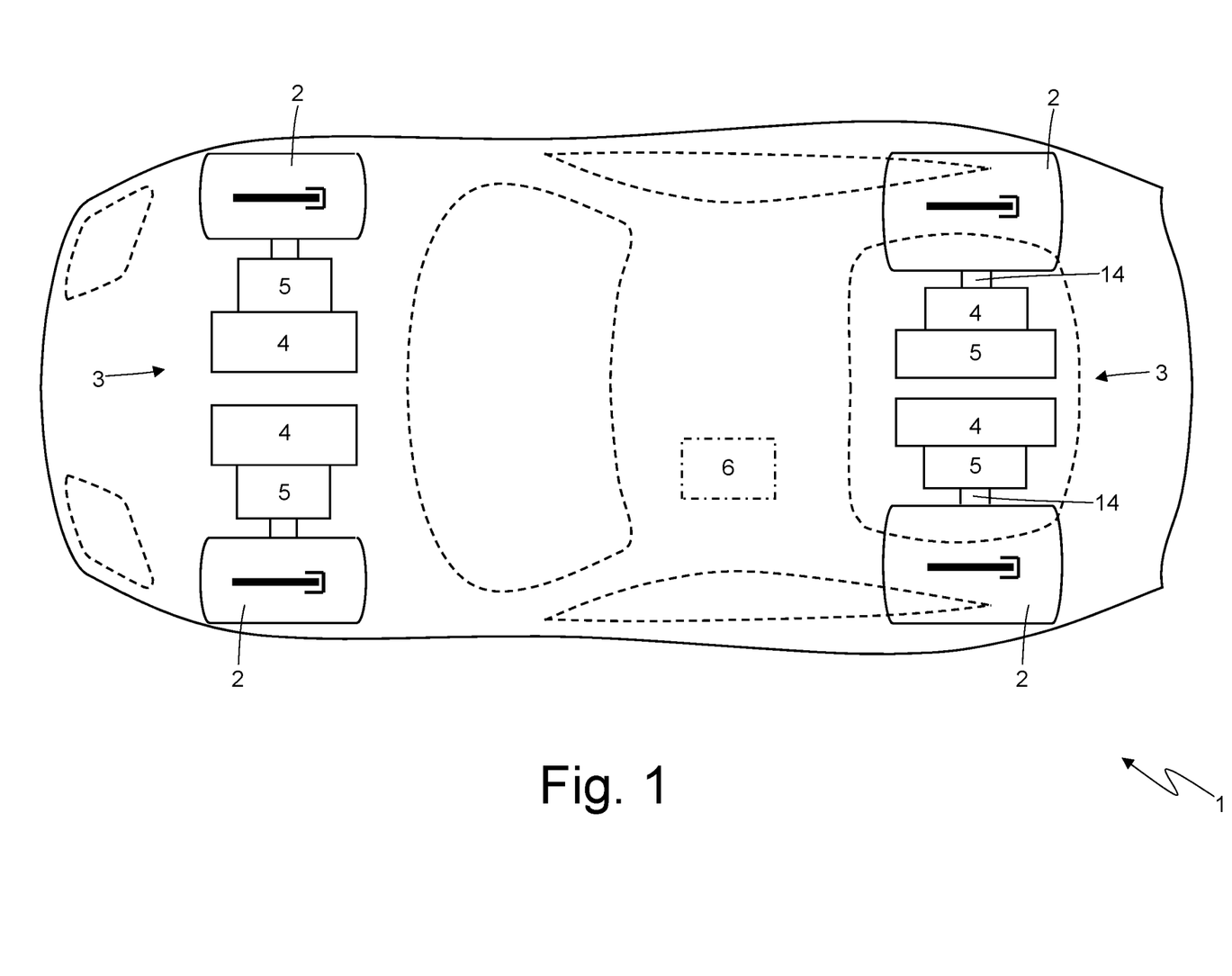
FIG. 1 is a schematic plan view of a car according to the invention.

In FIG. 1, number 1 indicates, as a whole, an electric drive car provided with four drive wheels 2 (two front drive wheels 2 and two rear drive wheels 2).

The car 1 comprises an electric powertrain system 3, which is arranged in a front position (namely, is connected to the two front drive wheels 2), and an electric powertrain system 3, which is arranged in a rear position (namely, is connected to the two rear drive wheels 2), is completely identical to the electric powertrain system 3 arranged in a front position from a structural point of view and is completely independent of and separate from the electric powertrain system 3 arranged in a front position from a mechanical point of view.

According to a different embodiment which is not shown herein, the road vehicle 1 comprises one single electric powertrain system 3 (arranged in a front position or arranged in a rear position) and, hence, only has two drive wheels 2.

Each electric powertrain system 3 comprises a pair of reversible electric machines 4 (i.e. which can work both as eclectic motor, absorbing electrical energy and generating a mechanical torque, and as electric generator, absorbing mechanical energy and generating electrical energy) provided with respective shafts and a pair of drivetrains 5, which connect the electric machines 4 (namely, the shafts of the electric machines 4) to the corresponding drive wheels 2 without the interposition of a clutch.

The electric powertrain systems 3 are controlled by an electronic control unit 6 in a coordinated manner.

Figure 2:
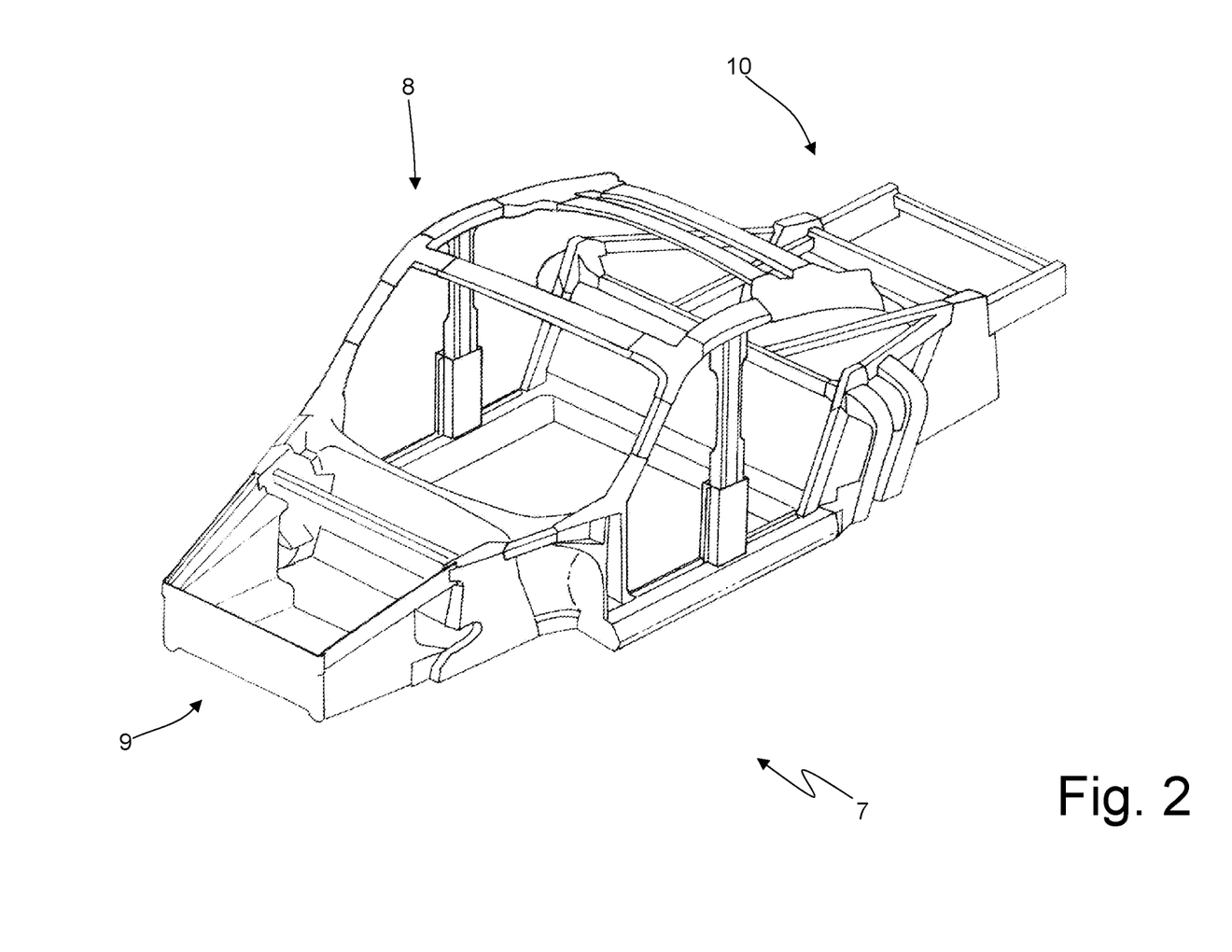
FIG. 2 is a highly schematic perspective view of a frame of the car of FIG. 1.

In FIG. 2, number 7 indicates a frame of the car 1 comprising a central body 8, where the passenger compartment of the car 1 is defined. To the central body 2 there are connected (for example, bolted), at the front, a front body 9, which supports the front wheels 2 and the front electric powertrain system 3, and, at the back, a rear body 10, which supports the rear wheels 2 and the rear electric powertrain system 3.

Figure 3:
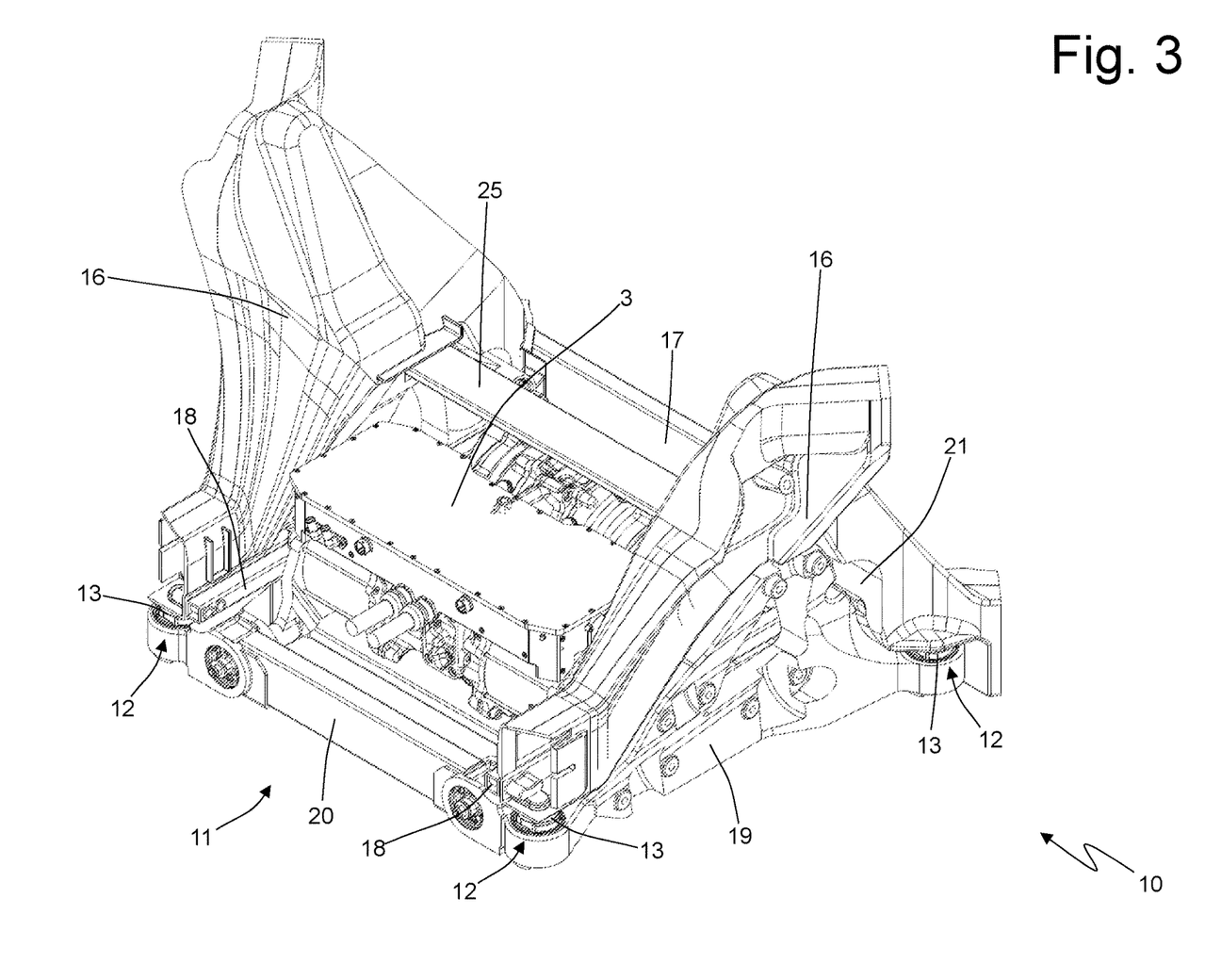
FIG. 3 is a perspective view of a rear subframe fixed to the frame of the car of FIG. 1.
Figure 4:
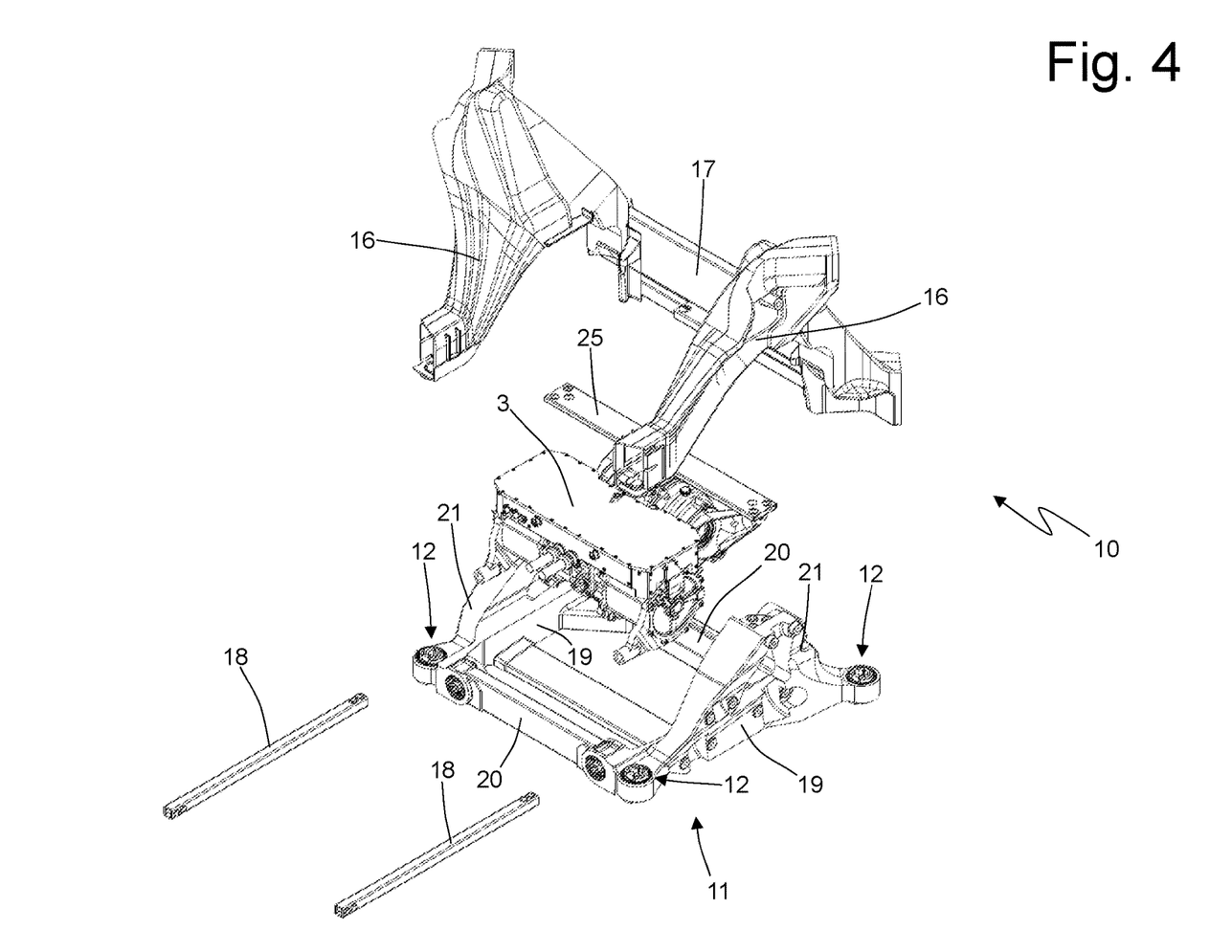
FIG. 4 is a perspective exploded view of the rear subframe and of part of the frame.
Figure 5:
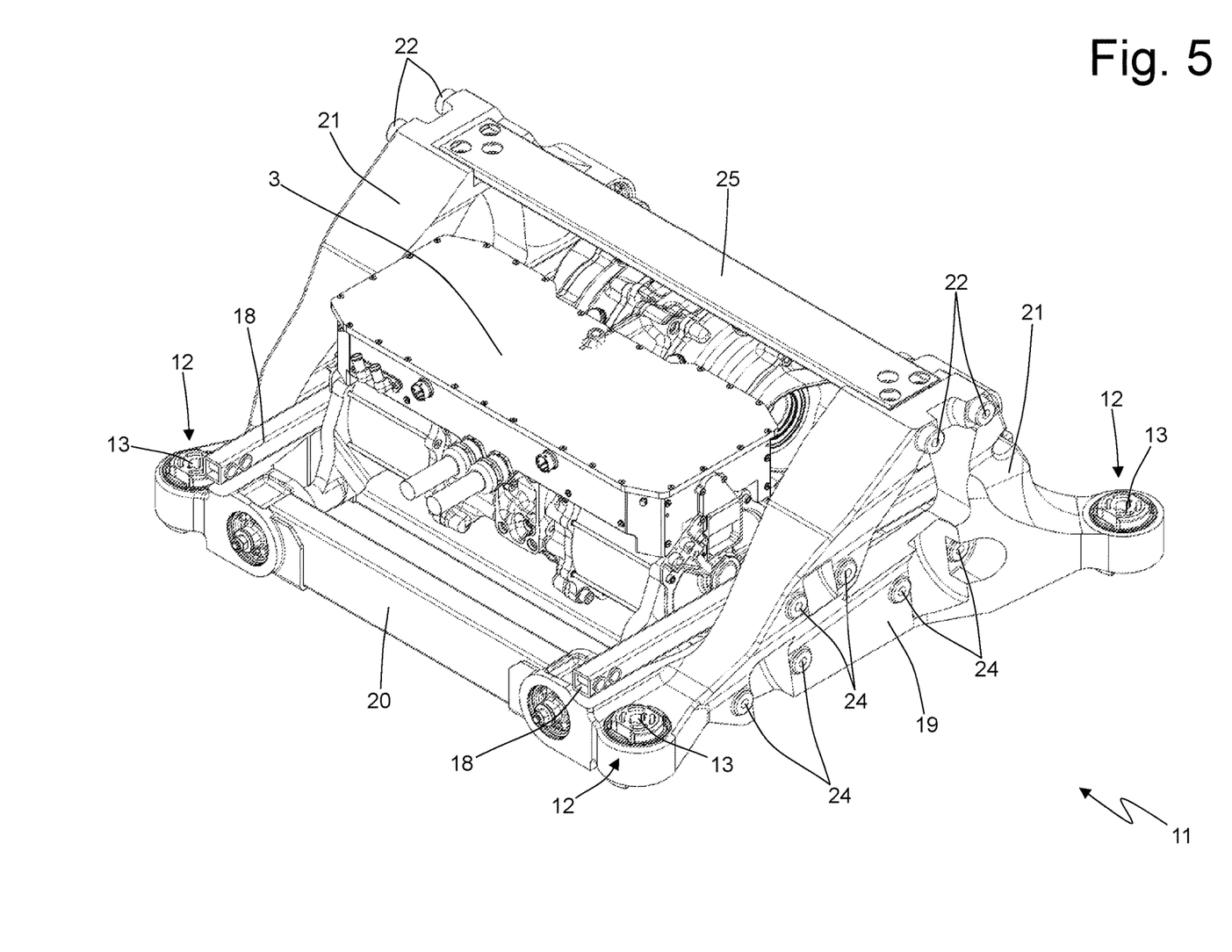
FIG. 5 is a perspective view of the rear subframe.
Figure 6:
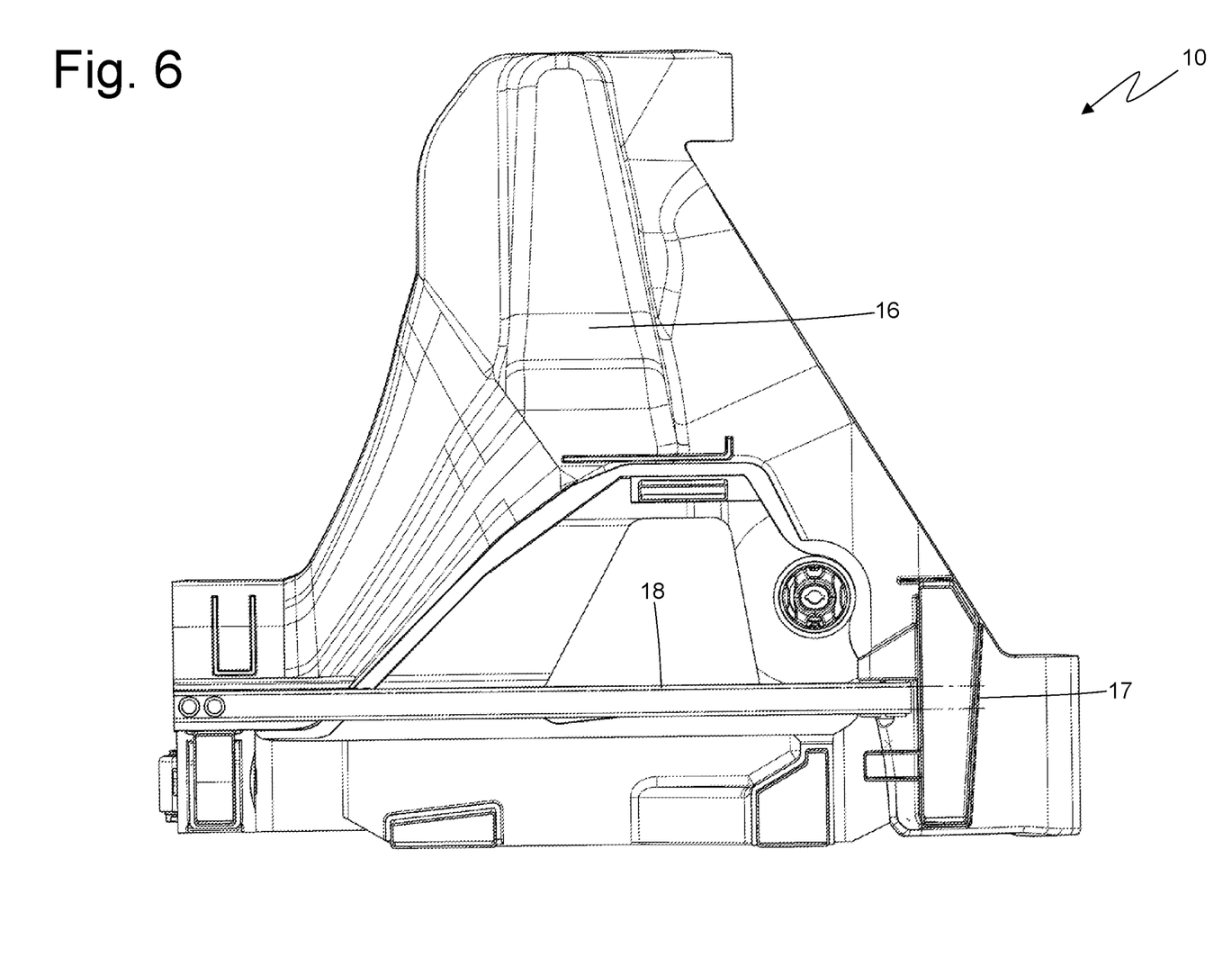
FIG. 6 is a longitudinal section of part of the frame.
Figure 7:
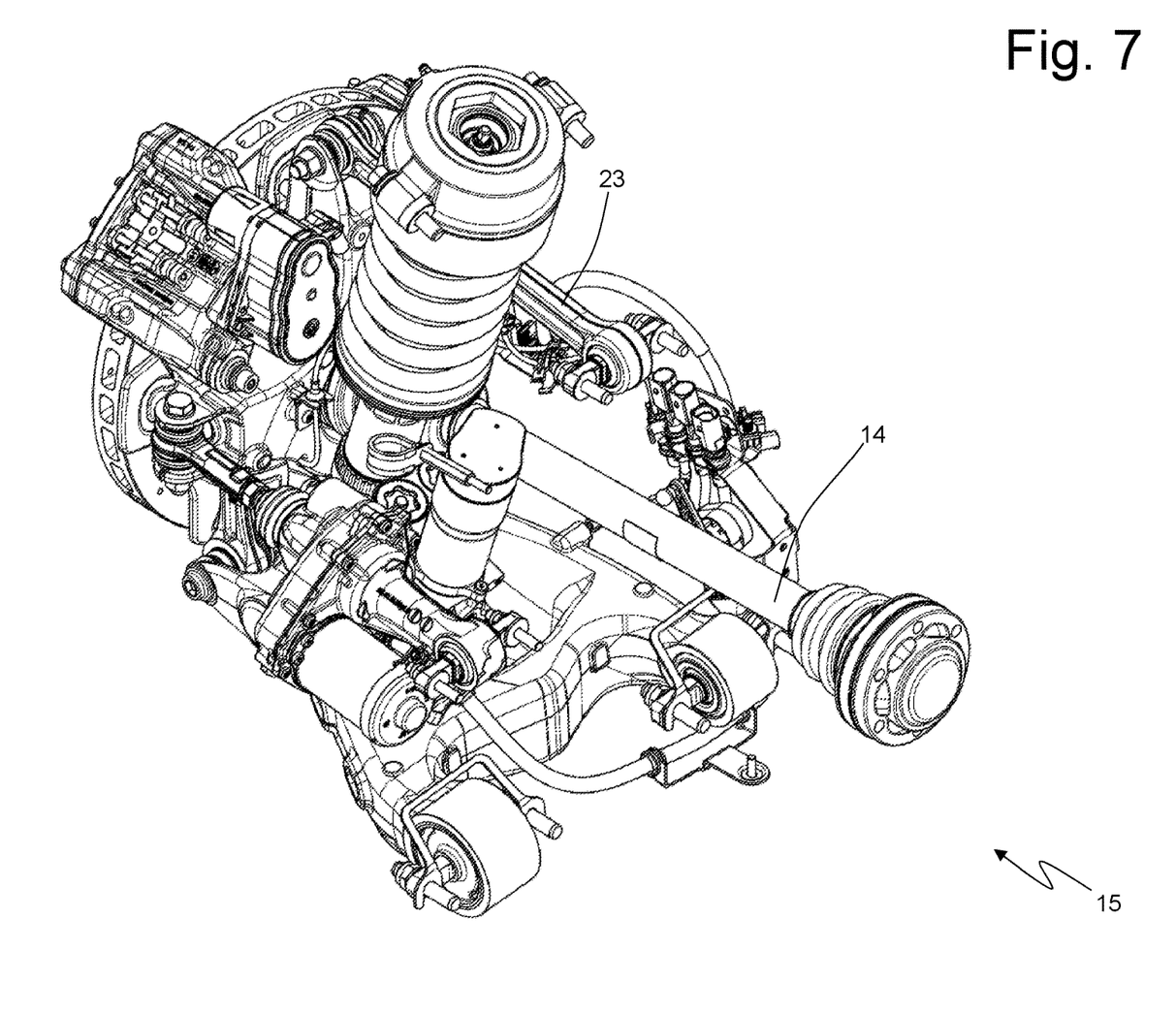
FIG. 7 is a perspective view of a rear suspension fixed to the rear subframe.

According to FIGS. 3, 4 and 5, a rear subframe 11 is provided, which is fixed to the frame 7 (in particular, to the rear body 10 of the frame 7) in four fixing points 12 through the interposition of elastic isolating elements 13. The rear subframe 11 directly supports the rear electric powertrain system 3, which is housed inside the rear subframe 11; two axle shafts 14 (which are better shown in FIG. 7) originate from the drivetrain 5 of the powertrain system 3 and project crosswise from the rear subframe 11 in order to transmit the motion to the rear drive wheels 2. Furthermore, the rear subframe 11 offers a coupling for the two rear suspensions 15 (one of them being shown in FIG. 7); namely, the two rear suspensions 15 are connected to the sole rear subframe 11 (hence, do not have any direct connection to the rear body 10 of the frame 7).

It should be pointed out that the four fixing points (12) are substantially arranged at the same vertical height; i.e. all four fixing points 12 have the same vertical height and, therefore, are coplanar, thus defining a horizontal plane.

The rear body 10 of the frame 7 comprises, among other things, two "C"-shaped elements 16, each having its two ends in the area of two fixing points 12. In the embodiment shown in the accompanying figures, the rear body 10 of the frame comprises a rear cross member 17, which is arranged crosswise and connects two rear ends of the two "C"-shaped elements 16 to one another. According to a different embodiment which is not shown herein, the rear body 10 of the frame 7 also comprises a front cross member, which is arranged crosswise and connects two front ends of the two "C"-shaped elements 16 to one another (in the embodiment shown in the accompanying figures there is no front cross member).

The rear body 10 of the frame 7 comprises two stiffening beams 18, each arranged longitudinally and screwed to the rear body 10 of the frame 7 in the area of the ends of a corresponding "C"-shaped element 16. It should be pointed out that the rear subframe 11 can be coupled to and uncoupled from the rear body 10 of the frame 7 only in the absence of the two stiffening beams 18; as a consequence, the two stiffening beams 18 need to removable and, therefore, are screwed (and not welded or glued) to the rest of the rear body 10 of the frame 7 (namely, to the two "C"-shaped elements 16). FIG. 5 artificially shows the rear subframe 11 together with the two stiffening beams 18 in the absence of the rest of the rear body 10 of the frame 7 for the sole purpose of better showing the positioning of the two stiffening beams 18 relative to the rear subframe 11; in practice, the two stiffening beams 18 can be present only in combination with the rest of the rear body 10 of the frame 7 and are screwed to the rest of the rear body 10 of the frame 7.

In the embodiment shown in the accompanying figures, each stiffening beam 18 is screwed, at the back, to the rear cross member 17; in particular, each stiffening beam 18 is screwed, at the back, to a lower face of the rear cross member 17. In the embodiment shown in the accompanying figures, each stiffening beam 18 is screwed, at the front, to a side face of a front end of a corresponding "C"-shaped element 16.

The rear subframe 11 comprises a base with the shape of a quadrilateral, which is obtained by joining four bars 19 and 20 and at whose vertexes there are the four fixing points 12; in particular, the rear subframe 11 comprises two longitudinal bars 19 and two transverse bars 20, which are joined to one another in order to form a quadrilateral. The rear subframe 11 comprises, on each side, a "C"-shaped support body 21, which has two legs originating from the quadrilateral-shaped base (in particular, from a longitudinal bar 19 of the quadrilateral-shaped base), builds—together with the base—a triangular shape holding, on the inside, a corresponding axle shaft 14 and, at its top, has a coupling 22 for a camber control bar 23 to control the camber of a corresponding rear suspension 15 (shown in FIG. 7). Each longitudinal bar 19 of the quadrilateral-shaped base of the rear subframe 11 laterally has couplings 24 for a corresponding rear suspension 15 (shown in FIG. 7); namely, each rear suspension 15 is laterally hinged to the quadrilateral-shaped base of the rear subframe 11.

According to a preferred embodiment, the rear subframe 11 comprises an upper cross member 25, which is arranged crosswise, connects the two support bodies 21 to one another and is screwed to the support bodies 21; indeed, the upper cross member 25 must be removed in order to allow the powertrain system 3 to be fitted into or removed from the rear subframe 11. As a consequence, the upper cross member 25 has to be removable and, hence, not screwed (and not welded or glued) to the rest of the rear subframe 11 (namely, to the two support bodies 21).

In the embodiment shown in the accompanying figures, the rear powertrain system 3 comprises two electric machines 4 beside one another (each of them causing the rotation of a corresponding axle shaft 14), which are both housed side by side in the rear subframe 11 (together with the two respective drivetrains 5). According to a different embodiment which is not shown herein, the rear powertrain system 3 comprises one single electric machine 4 (which causes the rotation of both axle shafts 14 by means of a differential), which is housed in the rear subframe 11 (together with the respective drivetrain 5). According to a further embodiment which is not shown herein, the rear powertrain system 3 comprises an internal combustion engine and a mechanical gearbox (which causes the rotation of both axle shafts 14 by means of a differential), which is housed in the rear subframe 11.

As mentioned above, the rear subframe 11 can be coupled to and uncoupled from the rear body 10 of the frame 7 only in the absence of the two stiffening beams 18; as a consequence, during the assembly of the car 1, the rear subframe 11 needs to be preliminarily fixed to the rear body 10 of the frame 7 in the area of the four fixing points 12 in the absence of the stiffening beams 18 and, then, the two stiffening beams 18 can be screwed to the rear body 10 of the frame 7, only after having fixed the rear subframe 11 to the rear body 10 of the frame 7. Similarly, in case the car 1 needs to be disassembled, the two stiffening beams 18 have to be preliminarily removed from the rear body 10 of the frame 7 before extracting the rear subframe 11 from the rear body 10 of the frame 7.

The embodiments described herein can be combined with one another, without for this reason going beyond the scope of protection of the invention.

The car 1 described above has numerous advantages.

First of all, the car 1 described above offers top comfort thanks to the use of the rear subframe 11 connected to the rear body 10 of the frame 7 through the interposition of the elastic isolating elements 13.

Furthermore, the car 1 described above also has high dynamic performances thanks to the fact that the fixing points 12 to fix the rear subframe 11 to the rear body 10 of the frame 7 are very close to the ground (namely, to the lower plane of the car 1) and that the camber control points (namely, the couplings 22 of the camber control bars 23) are distant from the ground (namely, from the lower plane of the car 1).

Finally, the car 1 described above has a great structural efficiency (measured, for example, as specific torsional stiffness, i.e. per mass unit) thanks to the presence of the stiffening beams 18, which are removable and ensure a high torsional stiffness even in the presence of the "C"-shaped elements 16, which are a significant part of the rear body 10 of the frame 7. Namely, the two stiffening beams 18 "close" the shape of the "C"-shaped elements 16 (which, in the absence of the two stiffening beams 18, would have an open and, hence, definitely less stiff shape), thus significantly increasing torsional stiffness.

LIST OF THE REFERENCE NUMBERS OF THE FIGURES 1 car
2 drive wheels
3 powertrain system 4 electric machine
5 drivetrain
6 control unit
7 frame
8 central body
9 front body
10 rear body
11 rear subframe
12 fixing points
13 elastic isolating elements
14 axle shafts
15 rear suspensions
16 "C"-shaped elements
17 rear cross member
18 stiffening beams
19 longitudinal bars
20 transverse bars
21 support body
22 coupling
23 control bar
24 coupling
25 upper cross bar

The invention claimed is:

1. A car (1) comprising:
a frame (7) having two "C"-shaped elements (16);
two rear drive wheels (2);
two rear suspensions (15), which support the two rear wheels (2);
a drivetrain (5) comprising two axle shafts (14), which transmit the motion to the rear drive wheels (2);
a rear subframe (11), which is fixed to the frame (7) in four fixing points (12) through the interposition of elastic isolating elements (13), directly supports at least part of the drivetrain (5), and provides a coupling for the rear suspensions (15);
wherein the four fixing points (12) are substantially arranged at the same vertical height;
wherein each "C"-shaped element (16) of the frame (7) has its two ends in the area of two fixing points (12); and
wherein two stiffening beams (18) are provided, each arranged longitudinally and screwed to the frame (7) in the area of the ends of a corresponding "C"-shaped element (16).

2. The car (1) according to claim 1, wherein the frame (7) comprises a rear cross member (17), which is arranged crosswise and connects two rear ends of the two "C"-shaped elements (16) to one another.

3. The car (1) according to claim 2, wherein each stiffening beam (18) is screwed to the rear cross member (17).

4. The car (1) according to claim 3, wherein each stiffening beam (18) is screwed, at the back, to a lower face of the rear cross member (17).

5. The car (1) according to claim 1, wherein each stiffening beam (18) is screwed, at the front, to a side face of a front end of a corresponding "C"-shaped element (16).

6. The car (1) according to claim 1, wherein the frame (7) comprises a front cross member, which is arranged crosswise and connects two front ends of the two "C"-shaped elements (16) to one another.

7. The car (1) according to claim 1, wherein the rear subframe (11) comprises a base with the shape of a quadrilateral, which is obtained by joining four bars (19, 20) and at whose vertexes there are the four fixing points (12).

8. The car (1) according to claim 7, wherein each rear suspension (15) is laterally hinged to the base.

9. The car (1) according to claim 7, wherein the rear subframe (11) comprises, on each side, a "C"-shaped support body (21), which has two legs originating from the base, builds—together with the base, a triangular shape accommodating, on the inside, a corresponding axle shaft (14) and has, in the area of its top, a coupling (22) for a camber control bar (23) of a corresponding rear suspension (15).

10. The car (1) according to claim 9, wherein the rear subframe (11) comprises an upper cross member (25), which connects the two support bodies (21) to one another and is screwed to the support bodies (21).

11. The car (1) according to claim 1, wherein the rear subframe (11) can be coupled to and uncoupled from the frame (7) only in the absence of the two longitudinal stiffening beams (18).

12. The car (1) according to claim 1, wherein the drivetrain (5) comprises a mechanical transmission, which is housed in the rear subframe (11), receives the motion from an internal combustion engine and causes the rotation of the two axle shafts (14).

13. The car (1) according to claim 1, wherein the drivetrain (5) receives the motion from at least one electric machine (4), which causes the rotation of the two axle shafts (14) and is housed in the rear subframe (11).

14. The car (1) according to claim 1, wherein the drivetrain (5) receives the motion from two electric machines (4) side by side, each causing the rotation of a corresponding axle shaft (14) and being housed in the rear subframe (11).

15. A mounting method to mount the car (1) according to claim 1 and comprising the steps of:
fixing the rear sub-frame (11) to the frame (7) in the area of the four fixing points (12) in the absence of the two longitudinal stiffening beams (18); and
screwing the two longitudinal stiffening beams (18) to the frame (7) after having fixed the rear subframe (11) to the frame (7).

* * * * *